US006242650B1

(12) United States Patent
Coudret et al.

(10) Patent No.: US 6,242,650 B1
(45) Date of Patent: Jun. 5, 2001

(54) PROCESS FOR THE DECOLORATION OF AQUEOUS EFFLUENTS COMPRISING AROMATIC AMINES

(75) Inventors: Jean-Luc Coudret, Baugy; Philippe Marion, Villeurbanne, both of (FR)

(73) Assignee: Rhodia Chimie, Cedex (FR)

( * ) Notice: Subject to any disclaimer, the term of this patent is extended or adjusted under 35 U.S.C. 154(b) by 0 days.

(21) Appl. No.: 09/510,798

(22) Filed: Feb. 23, 2000

Related U.S. Application Data

(63) Continuation of application No. 09/035,251, filed on Mar. 5, 1998.

(30) Foreign Application Priority Data

Jul. 3, 1997 (FR) ................................................ 97 02723

(51) Int. Cl.[7] .................................................. C07C 209/84

(52) U.S. Cl. ............................................. 564/437; 564/439
(58) Field of Search ..................................... 564/437, 439, 564/442, 443

(56) References Cited

U.S. PATENT DOCUMENTS

| 4,870,209 | * | 9/1989 | Kao et al. | 564/439 |
| 5,196,585 | * | 3/1993 | Wirth | 564/437 |
| 5,405,999 | * | 4/1995 | Donadello | 564/437 |

* cited by examiner

*Primary Examiner*—Jean F. Vollano
(74) *Attorney, Agent, or Firm*—Jean-Louis Seugnet

(57) ABSTRACT

The subject of the present invention is a process for the decoloration of aqueous effluents comprising aromatic amines or their derivatives, in which process the effluents are brought into contact with at least one agent chosen from alkali metal or alkaline earth metal sulfites or alkali metal or alkaline earth metal hydrogensulfites.

7 Claims, No Drawings

PROCESS FOR THE DECOLORATION OF AQUEOUS EFFLUENTS COMPRISING AROMATIC AMINES

This application is a continuation application of Ser. No.: 09/035,251, filed on Mar. 5, 1998.

The subject of the present invention is a process for the decoloration of aqueous effluents more particularly comprising aromatic amines.

Aromatic amines or polyamines are conventionally synthesized from the corresponding mononitro or polynitro aromatic derivatives by the use of a hydrogenation reaction. Such a type of process is commonly employed to prepare, among other compounds, aniline from mononitrobenzene the various isomers of toluidine from the isomers of mononitrotoluene or alternatively the various isomers of toluenediamine from the isomers of dinitrotoluene.

The hydrogenation reaction is accompanied by the production of large amounts of water, which it is necessary to separate from the amines synthesized before the latter are employed in subsequent conversion reactions. Such a scenario is found, for example, in the synthesis of toluene diisocyanates from toluenediamine.

The separation of water and the amines prepared takes place according to known methods, such as distillation, mainly The water recovered is coloured, or alternatively becomes coloured, because it contains more or less high amounts of amines. This is because aromatic amines, under the effect mainly of light and/or of atmospheric oxygen, oxidize to give conjugated polyaromatic compounds comprising, inter alia, azo functional groups. In some cases, there may even be the appearance of a precipitate in the water.

It is clear that such effluents cannot be discharged directly and must consequently form the subject of a pretreatment targeted at removing the amines and this coloration which they induce.

Various solutions have been provided, mainly with the aim of decolouring this water. Thus, mention may be made of processes in which amines present in aqueous effluents are oxidized. For example, treatments based on bleach, aqueous hydrogen peroxide solution or ozone, or those involving a concentrated sulfuric acid/nitric acid mixture or alternatively persulfate, are known. Processes are also known which employ physicochemical techniques, such as, for example, adsorption on resins, biological techniques, such as the use of enzymes, alone or in combination with chemical compounds, such as aqueous hydrogen peroxide solution, or which alternatively involve chemical treatments, such as the blocking of amines with aldehyde functional groups. Finally, it is possible to use methods of purification by an electrochemical route. These techniques, while their advantage is not questioned here, however exhibit various disadvantages. This is because some of the techniques provided are difficult to employ on an industrial scale and sometimes require the commitment and continuation of relatively large investments. This is the case, for example, when enzymes are used as treatment agent. The known means can also employ compounds which are rather unfavourable to the environment, as such or as a result of the products of which they are the source; compounds or products which have to be removed subsequently, for this reason requiring an additional stage.

Finally, these products are not always desired for reasons of industrial hygiene and safety.

The first objective of the present invention is thus to provide a method for decolouring aqueous effluents comprising aromatic amines which is simple to employ and inexpensive.

Another objective of the invention is to make available a very efficient process which would make it possible both to decolour water comprising aromatic amines and also to block the mechanism of coloration of this water.

These aims and others are achieved by the present invention, the subject of which is a process for the decoloration of an aqueous effluent comprising aromatic amines and/or their derivatives in which the said aqueous effluent is brought into contact with an agent chosen from alkali metal or alkaline earth metal sulfite, alkali metal or alkaline earth metal hydrogensulfite, or their mixtures.

As may be observed, the process according to the invention is very simple to employ. This is because the operation of bringing the agent into contact with the effluents to be treated is efficient and does not require restrictive conditions of employment, in particular as regards safety.

Moreover, the process according to the invention does not require the commitment of very large investments because it is sufficient to have available a vessel in which the abovementioned agent can be brought into contact with water.

In addition, it is pointed out that neither the sulfite nor the hydrogensulfite are the source of products which are harmful to the environment. On the one hand, the amounts employed are not very high and, on the other hand, the resulting products are essentially sulfates, which are not regarded as priority pollutants.

Moreover, and this constitutes a: additional advantage, the water treated according to the process of the present invention does not experience a substantial increase in its COD (Chemical Oxygen Demand). For this reason, it is not necessary, a priori, to combine the process according to the invention with an additional stage in which the COD of the effluents would be decreased.

However, other characteristics and advantages of the present invention will become more clearly apparent on reading the description and examples which will follow.

As was indicated previously, the present invention is intended to treat aqueous effluents comprising aromatic amines and/or their derivatives.

Aromatic mines is understood to mean aromatic mono- or polyamines comprising at least one $C_6$–$C_{14}$ aromatic unit. The aromatic nucleus is preferably $C_6$–$C_{10}$. The said aromatic nucleus may or may not be substituted by one or more saturated or unsaturated, linear, cyclic or branched, $C_1$–$C_{10}$ hydrocarbon radicals.

More specifically, the abovementioned hydrocarbon radicals optionally substituting the said aromatic units can be chosen from $C_1$–$C_{10}$, preferably $C_1$–$C_6$, alkyl, aryl, alkylaryl and arylalkyl radicals.

According to a preferred embodiment of the invention, the said amines are primary amines.

Mention may be made, as suitable mono- or polyfunctional amines, of those comprising a benzene or naphthalene nucleus substituted or not by one or more methyl, ethyl, propyl, butyl, pentyl or hexyl radicals and/or their isomers.

The process according to the invention can preferably be employed to treat aqueous effluents comprising at least one of the following amines: aniline, one or more of the isomers of toluidine, one or more of the isomers of toluenediamine, one or more of the isomers of xylylenediamine or one or more of the isomers of phenylenediamine.

It should be noted that the water treated according to the process of the invention is advantageously that recovered from the synthesis of the amines mentioned above.

However, of course, the present invention is not limited to this type of effluent. Thus, it can likewise be applied in the treatment of aqueous effluents comprising such amines, independently of their preparation.

Derivatives of aromatic amines is understood to denote the oxidation products of the aromatic amines defined previously. Thus, the treated effluents can comprise, optionally as a mixture with the abovementioned amines, oligomers obtained by oxidation of the latter. In this case, the derivatives can comprise primary, secondary or tertiary amine functional groups, alone or as a mixture. Moreover, the said derivatives can comprise other functional groups of the azo, imine or azoxy type, without, however, being limited to these examples.

The amount of amines present in the aqueous effluents to be treated depends on the source of the effluents, in other words on the conditions under which they were obtained. Thus, the amine content can be a function in particular of the operating conditions of the process or of the duration of storage of these effluents.

The process according to the invention can also be particularly appropriate for the treatment of discharge peaks, that is to say for the treatment of effluents comprising, in an unusual way, high amounts of amines. This is in particular the ease when water originating from the cleaning of plants in which amines are synthesized has to be treated.

In fact, the process according to the invention is very advantageous because of its versatile nature, in the sense that it can constitute both a main process for the treatment of amine-containing effluents and also a backup treatment in the event of a large increase in the content of aromatic amines in the said effluents.

By way of indication, the amount of aromatic amines present in the effluents to be treated according to the invention is, under normal conditions, at most of the order of 1000 ppm. Of course, it would not be departing from the scope of the present invention to treat effluents comprising a higher content of aromatic amines.

The treatment according to the invention thus consists in bringing into contact at least one agent chosen from at least one alkali metal or alkaline earth metal sulfite or at least one alkali metal or alkaline earth metal hydrogensulfite, it being possible for these compounds to be used alone or as a mixture.

Sodium sulphite, potassium sulfite, magnesium sulfite, calcium sulfite, sodium hydrogensulfite, potassium hydrogensulfite, magnesium hydrogensulfite and calcium hydrogensulfite are particularly suitable for the implementation of the invention, it being possible for these compounds to be employed, without distinction, alone or in the form of a mixture of several of them.

According to a specific embodiment of the invention, use is made of an alkali metal sulfite or hydrogensulfite. Sodium sulfite is preferably used.

The amount of agent involved in the treatment of the invention depends on the content of aromatic amines or of their derivatives present in the effluents.

Thus, the agent is employed in an amount at least stoichiometric with respect to the number of moles of amine functional groups present in the effluent to be treated. Use is preferably made of an amount of agent corresponding to an excess with respect to the number of moles of amine functional groups present in the effluent to be treated.

According to a particularly appropriate embodiment of the invention, use is made of an amount of agent corresponding to 1 to 10 equivalents with respect to one equivalent of amine functional group and preferably of an amount of agent greater than 1 equivalent with respect to the amine functional groups. It is possible, although this does not introduce specific advantages, to treat the effluents with amounts of agent greater than those indicated.

The amount of agent involved in the treatment according to the invention preferably corresponds to an excess of 4 to 7 equivalents with respect to one equivalent of amine functional group.

It should be noted that the amount of agent involved generally does not exceed 1% by weight with respect to the weight of the effluent to be treated.

The agent can be employed as is or in the form of an aqueous solution.

The operation of bringing into contact can take place, advantageously, at ambient temperature or else at a higher temperature, so as to accelerate the decoloration process. If the operation of bringing into contact is carried out with heating, the temperature generally remains in the region of 80° C. It is specified that, advantageously, the treatment of the effluents is carried out at the temperature at which they are recovered from the process.

A vessel can be used for the operation of bringing into contact preferably comprising stirring means.

The duration of the operation of bringing into contact depends on the action which it is desired to carry out. Thus, if it concerns blocking the coloration process, a very short time is sufficient because the reaction is instantaneous. In contrast, if it is desired to decolour the medium, a greater duration of bringing into contact is desirable. A person skilled in the art is entirely capable, by employing only his broad knowledge, of adapting the contact time according to the objectives to be achieved.

By way of indication, the duration of the operation of bringing into contact is of the order of one minute to several hours.

The effluents thus treated can, if necessary, form the subject of an additional purification treatment, if they originally contain other impurities, before or after the treatment according to the invention.

Concrete but non-limiting examples of the invention will now be presented.

EXAMPLES

The object of the examples is to demonstrate the advantage of the invention in blocking the coloration of effluents.

The visual assessment of the coloration is expressed with a number given in hazen units. The hazen number is a function of the Y1 value, correlated with the L, $a^*$, $b^*$ parameters of the system of colour measurement in the Hunter space (NF T20-605, June 1965).

The Y1 value was measured with a Minolta CT310 colorimeter (ASTM standard D-1925). In the Hunter space (L, $a^*$, $b^*$), two axes define the chromatic plane: one, red/green, represents the variations in $a^*$ (red if $a^*>0$), the other, yellow/blue, represents the variations in $b^*$ (yellow if $b^*>0$); the L axis corresponds to the brightness (L=0 for black, L=100 for white).

1) Composition of the Aqueous Mixture 100 ml samples of water are prepared comprising:

Ortho/meta/para isomers of toluidine: 500 ppm 2,3/3,4/2,6/2,4 isomers of toluenediamine: 200 ppm.

2) Results

The coloration measurements on the aqueous effluent as defined previously, after a storage time of 8 and of 11 days, exposed to light and to air, at ambient temperature, are collated in the following table.

When it is present, the agent is used with an amount corresponding to 1% by weight with respect to the total weight of the effluent.

NB: The initial coloration of the mixture corresponds to a value of 8 for Y1.

| AGENT | Y1 (hazen No.) (8 days) | Y1 (hazen No.) (11 days) |
|---|---|---|
| Reference | 16 (320 hazen) | 38 (OR) |
| Sodium nitrite | 16 (320 hazen) | 38 (OR) |
| Hydrogen peroxide (30%) | 19 (400 hazen) | 17 (350 hazen) |
| Sulfuric acid (98%) | 14 (270 hazen) | 29 (OR) |
| Sodium sulfite | 8 (145 hazen) | 7 (125 hazen) |

OR: Outside the hazen range

As may be observed, the process according to the invention makes it possible to efficiently block any process for the coloration of aqueous effluents.

Two phases are observed for aqueous hydrogen peroxide solution, one in which the coloration becomes more intense and a second in which it decreases. However, after storage for 20 days after treatment, the water resulting from the process according to the invention still exhibits a stable Y1 value, a value which remains lower than that obtained with aqueous hydrogen peroxide solution.

What is claimed is:

1. A process for the discoloration of an aqueous effluent comprising aromatic amines or their derivatives in an amount of at most around 1000 p.p.m., consisting essentially of bringing said aqueous effluent into contact with an agent, said agent being an alkali metal sulfite, an alkaline earth metal sulfite, an alkali metal hydrogensulfite, an alkaline earth metal hydrogensulfite, or their mixtures.

2. A process according to claim 1, wherein the agent is used in an amount at least stoichiometric with respect to the number of moles of amine functional groups present in the effluent to be treated.

3. A process according to claim 2, wherein the amount of the agent is in excess with respect to the number of moles of amine functional groups present in the effluent to be treated.

4. A process according to claim 2, wherein the amount of agent corresponds to 1 to 10 equivalents with respect to one equivalent of amine functional group.

5. A process according to claim 1, wherein the agent is used as is or in solution.

6. A process according to claim 2, wherein the agent is used as is or in solution.

7. A process according to claim 4, wherein the agent is used as is or in solution.

* * * * *